US010151356B2

(12) United States Patent
Fujinuma et al.

(10) Patent No.: US 10,151,356 B2
(45) Date of Patent: Dec. 11, 2018

(54) HYDRAULIC ENGAGEMENT DEVICE

(71) Applicant: HONDA MOTOR CO., LTD., Tokyo (JP)

(72) Inventors: Sachi Fujinuma, Wako (JP); Sota Tanaka, Wako (JP); Eisuke Hosoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 382 days.

(21) Appl. No.: 15/014,010

(22) Filed: Feb. 3, 2016

(65) Prior Publication Data

US 2016/0223032 A1 Aug. 4, 2016

(30) Foreign Application Priority Data

Feb. 4, 2015 (JP) .................................. 2015-019926

(51) Int. Cl.
*F16D 25/08* (2006.01)
*F16D 25/12* (2006.01)
*F16D 25/0638* (2006.01)

(52) U.S. Cl.
CPC ....... *F16D 25/082* (2013.01); *F16D 25/0638* (2013.01); *F16D 25/083* (2013.01); *F16D 25/126* (2013.01); *F16D 2300/08* (2013.01)

(58) Field of Classification Search
CPC .... F16D 25/0638; F16D 25/08; F16D 25/082; F16D 25/083; F16D 25/126; F16D 2300/08
See application file for complete search history.

(56) References Cited

U.S. PATENT DOCUMENTS

| | | | | | |
|---|---|---|---|---|---|
| 2,965,207 | A | * | 12/1960 | Snyder | ................ F16D 25/0638 188/196 R |
| 3,747,727 | A | * | 7/1973 | Dach | ................... F16D 25/0638 138/115 |
| 5,234,090 | A | * | 8/1993 | Haka | ..................... F16D 25/082 188/196 P |
| 5,931,275 | A | * | 8/1999 | Kasuya | ............... F16H 63/3026 192/109 R |
| 2011/0221292 | A1 | * | 9/2011 | Kuwahara | ............. F16D 25/082 310/78 |
| 2014/0262674 | A1 | * | 9/2014 | Saito | ...................... B60K 6/387 192/70.11 |

FOREIGN PATENT DOCUMENTS

JP 2007-271017 10/2007

* cited by examiner

*Primary Examiner* — Ramya P Burgess
*Assistant Examiner* — David R Morris
(74) *Attorney, Agent, or Firm* — Mori & Ward, LLP

(57) ABSTRACT

A hydraulic engagement device includes a first friction engagement element, a second friction engagement element, a cylinder, a piston, an oil chamber, hydraulic oil, and a release groove. The first friction engagement element and the second friction engagement element are to rotate around a third rotational axis. The piston is slidably provided in the cylinder. The oil chamber is defined between the piston and the cylinder. The hydraulic oil is supplied to the oil chamber to move the piston to push the first friction engagement element or the second friction engagement element so that the first friction engagement element engages the second friction engagement element. The release groove is provided on the cylinder or the piston. The hydraulic oil in the oil chamber is released through the release groove when a stroke of the piston exceeds a predetermined level.

6 Claims, 5 Drawing Sheets

ENGAGED STATE

HYDRAULIC ENGAGEMENT DEVICE

CROSS-REFERENCE TO RELATED APPLICATIONS

The present application claims priority under 35 U.S.C. § 119 to Japanese Patent Application No. 2015-019926, filed Feb. 4, 2015, entitled "Hydraulic Engagement Device." The contents of this application are incorporated herein by reference in their entirety.

BACKGROUND

Field of the Invention

The present disclosure relates to a hydraulic engagement device.

Description of the Related Art

From Japanese Unexamined Patent Application Publication No. 2007-271017, there is known a technique by which, when a transmission of a motor vehicle is put into a non-drive range, a change in oil temperature is repeatedly calculated over a predetermined period of time while friction engagement elements are brought into sliding contact with each other by causing oil pressure supplied to a hydraulic clutch oil chamber of the transmission to be slightly increased and, if the change in oil temperature is greater than a predetermined level, it is determined that the friction engagement elements of the hydraulic clutch are in a normal engagement state and, if the change in oil temperature is smaller than a predetermined level, it is determined that the friction engagement elements of the hydraulic clutch are in an abnormal engagement state whereby a defective engagement of the hydraulic clutch due to worn friction engagement elements is detected.

SUMMARY

According to one aspect of the present invention, a hydraulic engagement device includes a cylinder, a piston that is slidably fitted to the cylinder, an oil chamber defined between the piston and the cylinder, and a plurality of friction engagement elements disposed between a first member and a second member that are rotatable relative to each other, in which oil pressure acting on the oil chamber is used to slide the piston relative to the cylinder whereby the plurality of friction engagement elements are engaged with one another in such a manner as to couple the first member and the second member together so as not to be relatively rotatable, in which the hydraulic engagement device has a sealing member provided on one of the cylinder and the piston and has a release groove provided on the other one, and in which, when a stroke of the piston exceeds a predetermined level due to wear of the friction engagement elements, the oil chamber releases oil pressure through the sealing member and the release groove.

According to another aspect of the present invention, a hydraulic engagement device includes a first member, a second member, a first friction engagement element, a second friction engagement element, a cylinder, a piston, an oil chamber, hydraulic oil, a sealing member, and a release groove. The first member is rotatable around a first rotational axis. The second member is rotatable around a second rotational axis. The first friction engagement element is connected to the first member to rotate around a third rotational axis. The second friction engagement element is connected to the second member to rotate around the third rotational axis. The piston is slidably provided in the cylinder. The oil chamber is defined between the piston and the cylinder. The hydraulic oil is supplied to the oil chamber to move the piston to push the first friction engagement element or the second friction engagement element so that the first friction engagement element engages the second friction engagement element. The sealing member is provided between the cylinder and the piston to seal the oil chamber. The release groove is provided on the cylinder or the piston. The hydraulic oil in the oil chamber is released through the release groove when a stroke of the piston exceeds a predetermined level.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
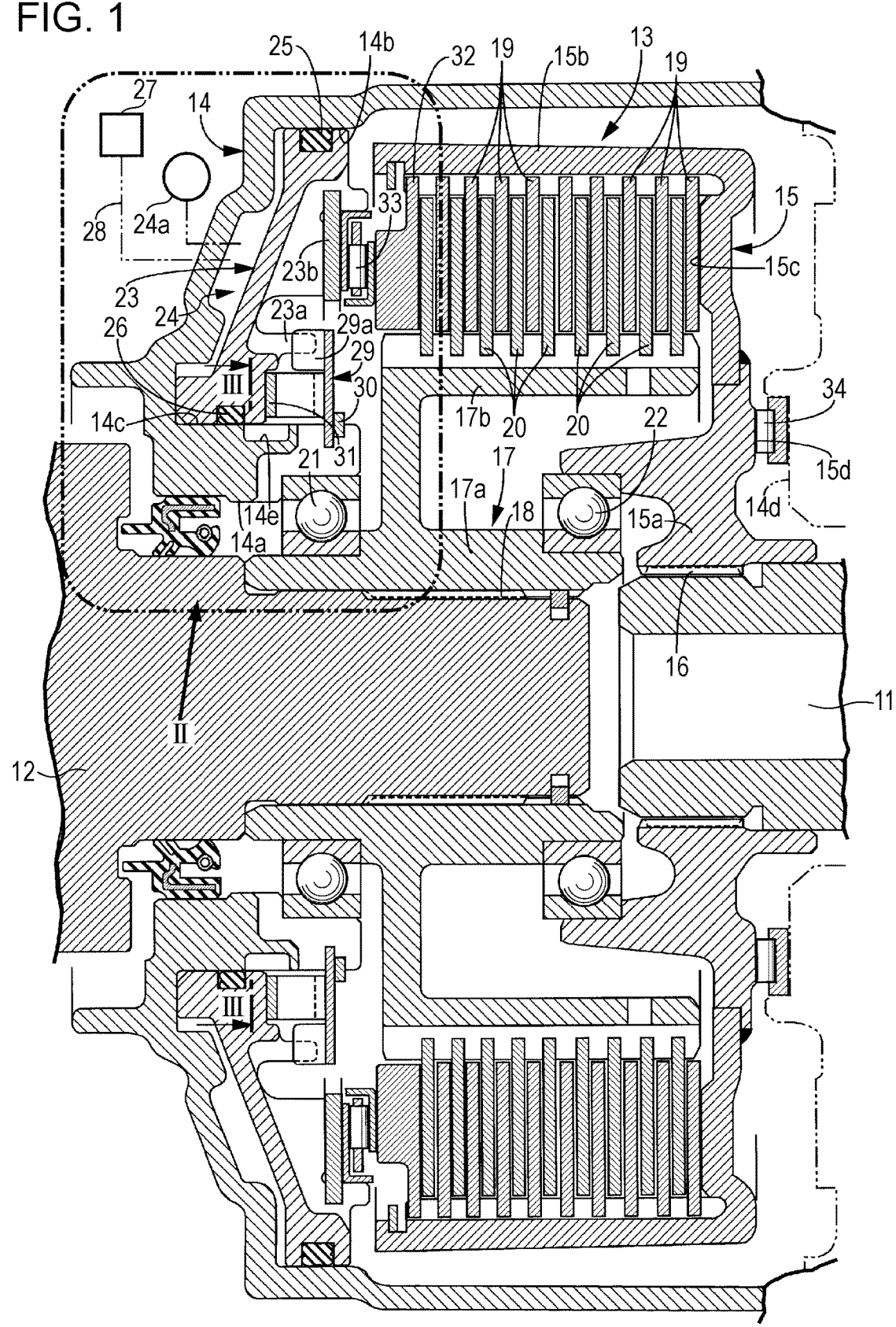
FIG. 1 is a longitudinal cross-sectional view of a hydraulic clutch of a motor vehicle drive power transmission device (according to a first embodiment).

The embodiments will now be described with reference to the accompanying drawings, wherein like reference numerals designate corresponding or identical elements throughout the various drawings.

First Embodiment

A first embodiment of the present application will be described below with reference to FIGS. 1 through 4.

Figure 2:
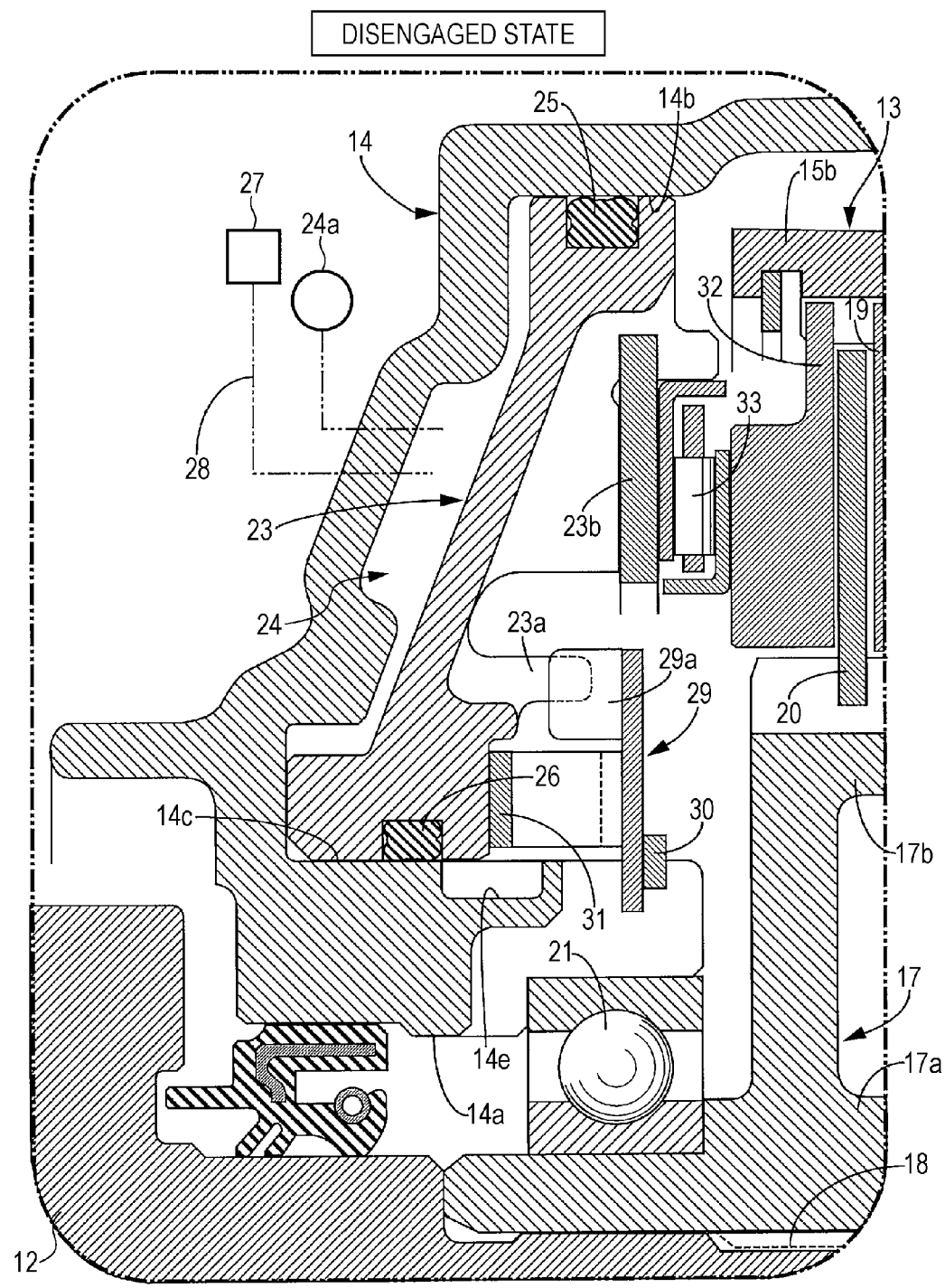
FIG. 2 is an enlarged view of a section II of FIG. 1 (according to a first embodiment).
Figure 3:
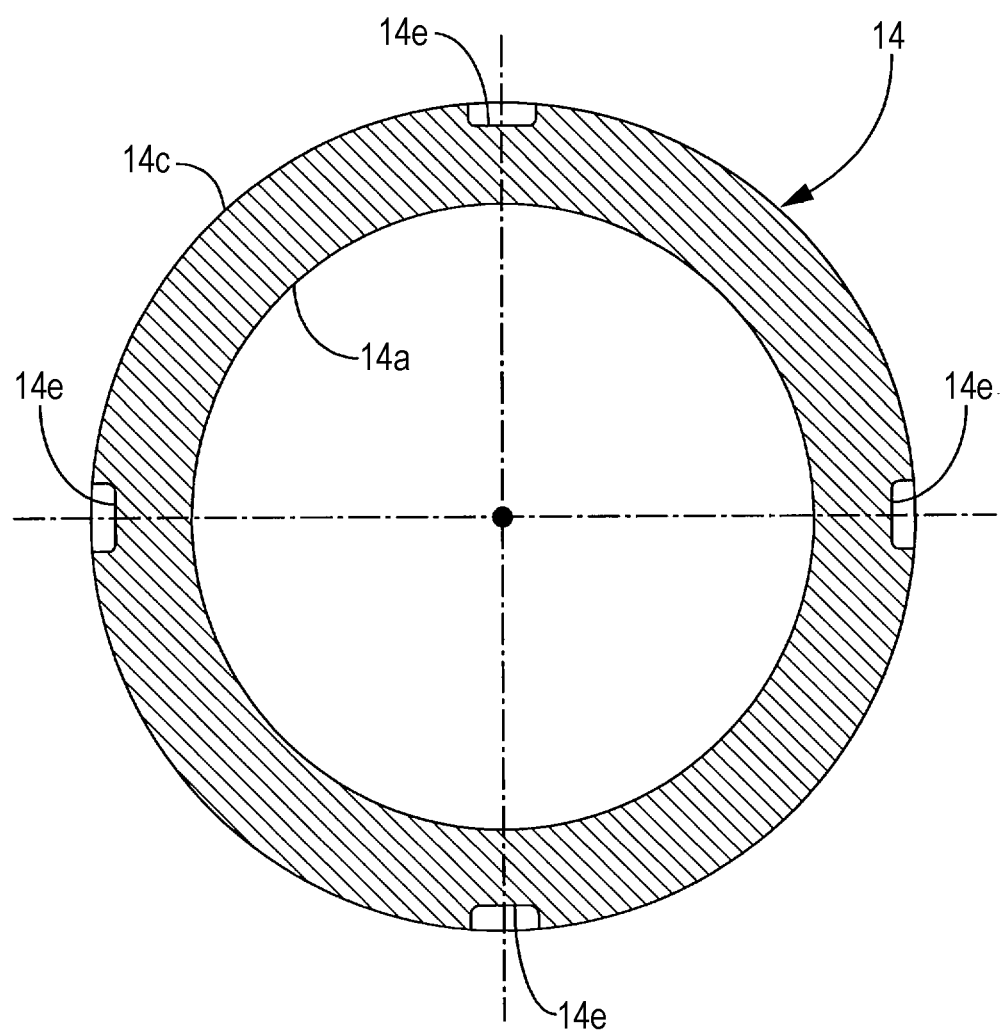
FIG. 3 is a cross-sectional view taken along line III-III of FIG. 1 (according to a first embodiment).

A motor vehicle drive power transmission device shown in FIGS. 1 and 2 is a device that connects a first rotating shaft 11 to right and left second rotating shafts 12, 12 joined to right and left drive wheels via right and left hydraulic clutches 13, 13. The first rotating shaft 11 is disposed in the vehicle-width direction between the right and left drive wheels and receives drive power from an engine. These figures show the left hydraulic clutch 13 that connects a left end of the first rotating shaft 11 to a right end of the second rotating shaft 12. Since the right and left hydraulic clutches 13, 13 have substantially the same structure, only the left hydraulic clutch 13 is described below with regard to the structure and operation and a description of the right hydraulic clutch 13 is omitted.

The first rotating shaft 11 is disposed inside a casing 14 of the motor vehicle drive power transmission device. A left half of the second rotating shaft 12 disposed coaxially with the first rotating shaft 11 extends outward from an opening 14a of the casing 14. The hydraulic clutch 13 that couples the first rotating shaft 11 and the second rotating shaft 12 together so as not to be relatively rotatable includes a clutch guide 15 whose boss portion 15a is joined to the left end of the first rotating shaft 11 by means of spline fitting 16, a clutch hub 17 whose boss portion 17a is joined to the right end of the second rotating shaft 12 by means of spline fitting 18, a plurality of pressure plates 19 that are splined to a guide portion 15b of the clutch guide 15, and a plurality of friction plates 20 that are splined to a guide portion 17b of the clutch hub 17. The pressure plates 19 and the friction plates 20 are alternately arranged in an axial direction so as to be engageable with each other.

A ball bearing 21 is disposed between the opening 14a of the casing 14 and a left end of a boss portion 17a of the clutch hub 17. The second rotating shaft 12 is rotatably supported on the casing 14 via the ball bearing 21. In addition, a ball bearing 22 is disposed between a right end of the boss portion 17a of the clutch hub 17 and a left end of the boss portion 15a of the clutch guide 15. The first rotating shaft 11 and the second rotating shaft 12 are connected via the ball bearing 22 so as to be rotatable relative to each other.

A large-diameter external cylinder 14b and a small-diameter internal cylinder 14c are coaxially disposed inside the casing 14, into which an annular clutch piston 23 is fit so as to be axially slidable whereby a clutch oil chamber 24 is defined between the casing 14 and the clutch piston 23. The clutch piston 23 is provided at an outer circumferential surface thereof with an O-ring 25 that seals a gap between the casing 14 and the external cylinder 14b and is also provided at an inner circumferential surface thereof with an O-ring 26 that seals a gap between the casing 14 and the internal cylinder 14c. The internal cylinder 14c of the casing 14 on which the O-ring 26 is slidable has four release grooves 14e that are circumferentially spaced, for example, 90 degrees apart from one another (see FIGS. 2 and 3).

An oil pressure controller 27 including an oil pump and a plurality of hydraulic valves is connected to the clutch oil chamber 24 via an oil passage 28. The clutch oil chamber 24 is provided with an oil pressure sensor 24a that senses the oil pressure of the clutch oil chamber 24.

An annular spring sheet 29 is splined to the opening 14a of the casing 14 and is retained with a circlip 30. Projections 29a provided on the spring sheet 29 and projections 23a provided on the clutch piston 23 are engaged with each other, whereby the clutch piston 23 is prevented from rotating in conjunction with the clutch guide 15 and the clutch hub 17. A return spring 31 including a wave spring is disposed between the clutch piston 23 and the spring sheet 29. The clutch piston 23 is biased by a repulsive force of the return spring 31 toward the direction in which the clutch oil chamber 24 declines in volume.

A thrust bearing 33 for transmitting a pressing force while absorbing differential rotation of the clutch guide 15 and the clutch piston 23 is disposed between a bearing support 23b provided on the clutch piston 23 and an end plate 32 splined to a left end of the guide portion 15b of the clutch guide 15. The end plate 32 opposes the leftmost friction plate 20 so as to be contactable, while the rightmost pressure plate 19 opposes a first load receiving surface 15c of the clutch guide 15 so as to be contactable. In addition, a thrust bearing 34 for supporting a pressing force while absorbing differential rotation of the clutch guide 15 and the casing 14 is disposed between a second load receiving surface 15d of the clutch guide 15 and a fixed wall 14d provided inside the casing 14.

Next, the first embodiment of the present application is described below in terms of effects.

As shown in FIG. 2, when the hydraulic clutch 13 is not engaged, oil pressure supplied from the oil pressure controller 27 to the clutch oil chamber 24 through the oil passage 28 decreases whereby the clutch piston 23 moves leftward due to a repulsive force of the return spring 31, which causes the pressure plates 19 and the friction plates 20 to become disengaged from each other. As a result, torque transmission is discontinued, causing the first rotating shaft 11 and the second rotating shaft 12 to become disconnected from each other so as to be relatively rotatable.

When oil pressure supplied from the oil pressure controller 27 to the clutch oil chamber 24 through the oil passage 28 increases, the clutch piston 23 moves rightward against a repulsive force of the return spring 31. As a result, pressing force of the clutch piston 23 is transmitted through a path from the bearing support 23b to the thrust bearing 33 to the end plate 32 and the plurality of pressure plates 19 and friction plates 20 to the first load receiving surface 15c of the clutch guide 15 to the second load receiving surface 15d of the clutch guide 15 to the thrust bearing 34. Finally, the pressing force is supported on the fixed wall 14d of the casing 14. The plurality of pressure plates 19 and friction plates 20 are held between the end plate 32 and the first load receiving surface 15c of the clutch guide 15 so as to be attached firmly to each other. This enables torque transmission between the clutch guide 15 and the clutch hub 17, connecting the second rotating shaft 12 to the first rotating shaft 11 so as not to be relatively rotatable. At this time, differential rotation between the rotating clutch guide 15 and the clutch piston 23 and the casing 14 that are stationary is absorbed by the thrust bearings 33, 34.

When the hydraulic clutch 13 becomes engaged through the process of a rightward movement of the clutch piston 23 caused by hydraulic pressure acting on the clutch oil chamber 24, the O-ring 26 provided on the inner circumferential surface of the clutch piston 23 slightly runs upon the release grooves 14e provided on the internal cylinder 14c of the casing 14. When the pressure plates 19 and the friction plates 20 exhibit little wear, the sealing performance of the O-ring 26 is not adversely affected and there is no pressure release from the clutch oil chamber 24.

Figure 4:
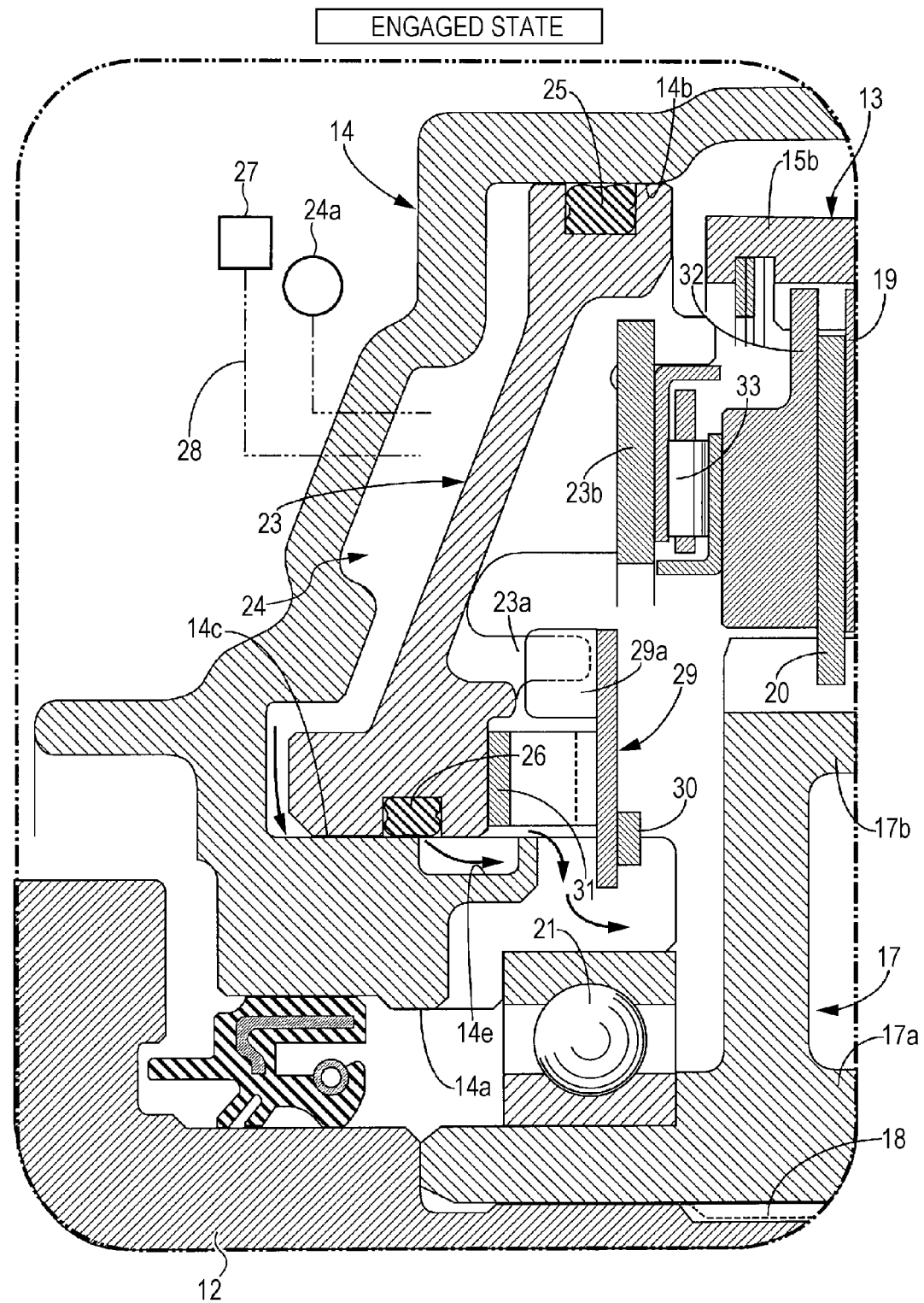
FIG. 4 is an explanatory diagram of operation corresponding to FIG. 2 (according to a first embodiment).

However, as shown in FIG. 4, when wear of the pressure plates 19 and the friction plates 20 progresses after an extended period of service, a stroke of the clutch piston 23 in the rightward direction associated with the engagement of the hydraulic clutch 13 gradually increases. In due course of time when the O-ring 26 runs upon the release grooves 14e of the internal cylinder 14c to a large extent, the clutch oil chamber 24 releases oil pressure through the O-ring 26 and the release grooves 14e.

Such an oil pressure release from the clutch oil chamber 24 does not enable the pressure plates 19 and the friction plates 20 to have a sufficient engagement pressure, which prevents the wear of the pressure plates 19 and the friction plates 20 from further progressing. This prevents a significant reduction in the torque capacity of the hydraulic clutch 13, thereby enabling the vehicle to run for the time being.

Oil pressure supplied to the clutch oil chamber 24 associated with the engagement of the hydraulic clutch 13 is maintained by the oil pressure controller 27 at a predetermined target level. If the oil pressure of the clutch oil chamber 24 drops below the target level due to a pressure release, such a drop is detected by the oil pressure sensor 24a whereby progression of wear of the pressure plates 19 and the friction plates 20 can be reliably determined. By doing this, the driver of the vehicle can be alerted to the progression of wear of the pressure plates 19 and the friction plates 20 and be urged to perform maintenance or repair work before the vehicle fails to run normally.

Second Embodiment

Figure 5:
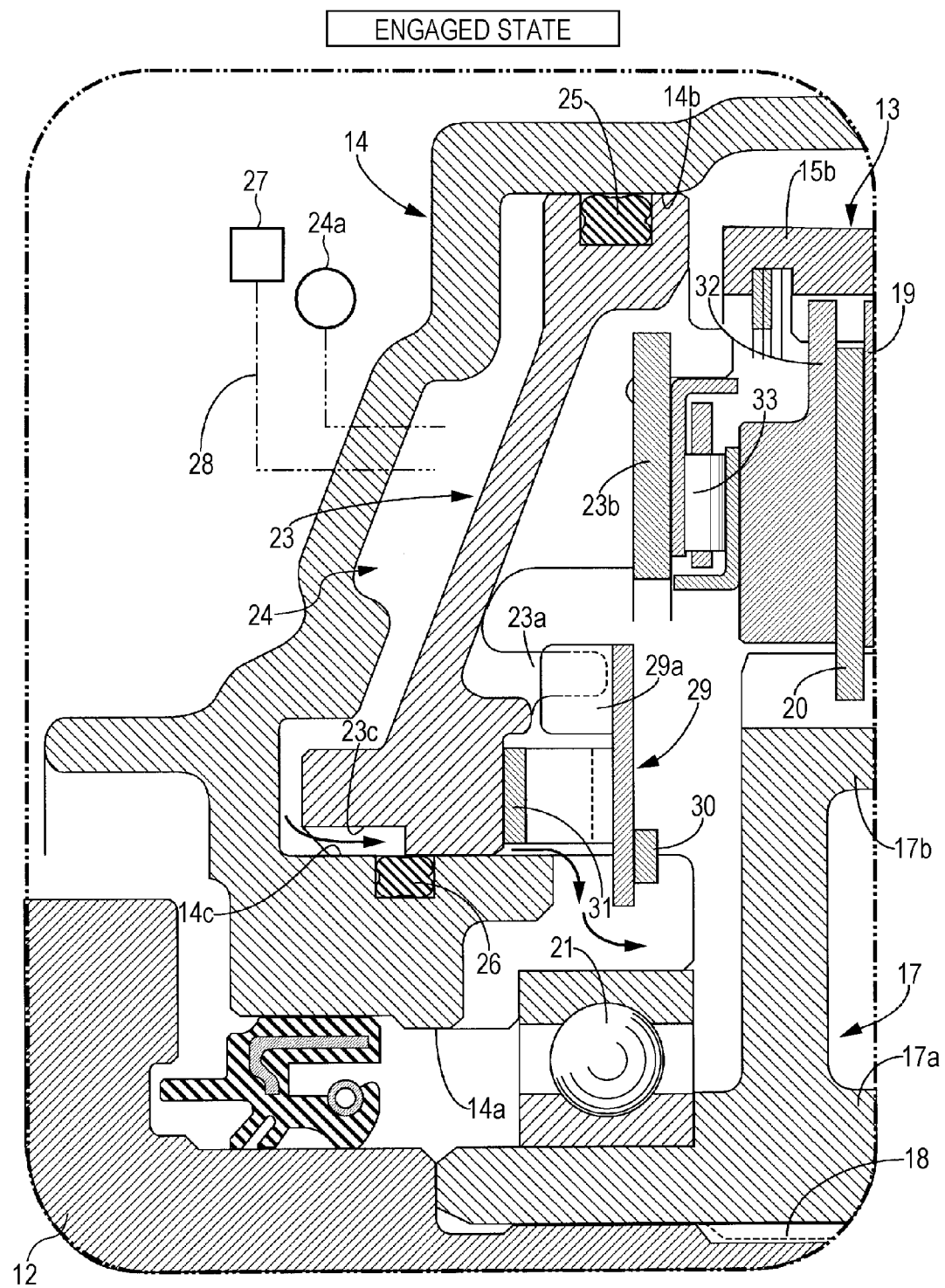
FIG. 5 is an explanatory diagram of operation corresponding to FIG. 3 (according to a second embodiment).

A second embodiment of the present application will be described below with reference to FIG. 5.

In the first embodiment, the O-ring 26 is provided on the clutch piston 23, while the release grooves 14e are provided on the casing 14. In the second embodiment, however, a release grooves 23c are provided on the clutch piston 23, while the O-ring 26 is provided on the casing 14, which are arranged in a manner exactly the opposite of the first embodiment.

With this arrangement, when a stroke of the clutch piston 23 in the direction in which the clutch piston 23 is engaged exceeds a predetermined level due to progression of wear of the pressure plates 19 and the friction plates 20, the clutch oil chamber 24 has an oil pressure release occurring through the O-ring 26 and the release grooves 14e. Thus, in the second embodiment constructed in this manner as well, substantially the same effect as in the first embodiment can be obtained.

The present application is typically described with reference to, but not limited to, the foregoing embodiments. Various modifications are conceivable within the scope of the present application.

For example, the hydraulic engagement device according to the present application is not limited to the hydraulic clutch 13 that joins the relatively rotatable first and second rotating shafts 11, 12, and may include a hydraulic brake that joins a rotating shaft to a stationary member like a casing. In other words, both the first and second members according to the present application are not necessarily rotating shafts, but one may be a rotating shaft and the other may be a stationary member.

Since the present application can achieve the effect described above through the combination of sealing members and release grooves, the oil pressure sensor 24a is not necessarily required.

Although the oil pressure sensor 24a directly detects oil pressure of the clutch oil chamber 24 in the embodiments, the oil pressure of the clutch oil chamber 24 may be detected indirectly from oil pressure of the oil passage 28 communicating with the clutch oil chamber 24.

A first rotating shaft 11 of an embodiment corresponds to a first member of the present application, a second rotating shaft 12 of an embodiment corresponds to a second member of the present application, an external cylinder 14b and an internal cylinder 14c of an embodiment correspond to a cylinder of the present application, a pressure plate 19 and a friction plate 20 of an embodiment correspond to a friction engagement element of the present application, a clutch piston 23 of an embodiment corresponds to a piston of the present application, a clutch oil chamber 24 of an embodiment corresponds to an oil chamber of the present application, and an O-ring 26 of an embodiment corresponds to a sealing member of the present application.

A first aspect of the present application provides a hydraulic engagement device that includes a cylinder, a piston that is slidably fitted to the cylinder, an oil chamber defined between the piston and the cylinder, and a plurality of friction engagement elements disposed between a first member and a second member that are rotatable relative to each other, in which oil pressure acting on the oil chamber is used to slide the piston relative to the cylinder whereby the plurality of friction engagement elements are engaged with one another in such a manner as to couple the first member and the second member together so as not to be relatively rotatable, in which the hydraulic engagement device has a sealing member provided on one of the cylinder and the piston and has a release groove provided on the other one, and in which, when a stroke of the piston exceeds a predetermined level due to wear of the friction engagement elements, the oil chamber releases oil pressure through the sealing member and the release groove. This prevents the wear of the friction engagement elements from further progressing and, as a result, avoids a significant reduction in torque capacity of the hydraulic engagement device, thereby enabling the vehicle to run for the moment.

A second aspect of the present application provides a hydraulic engagement device of the first aspect that may include an oil pressure sensor that detects oil pressure of the oil chamber. With this arrangement, a drop in oil pressure of the oil chamber below a target oil pressure level can be used to reliably determine the occurrence of an oil pressure release whereby a vehicle driver can be alerted to progression of the wear and be urged to perform maintenance or repair work before the wear of the friction engagement elements progresses.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic engagement device that includes a cylinder, a piston that is slidably fitted to the cylinder, an oil chamber defined between the piston and the cylinder, and a plurality of friction engagement elements disposed between a first member and a second member that are rotatable relative to each other, in which oil pressure acting on the oil chamber is used to slide the piston relative to the cylinder whereby the plurality of friction engagement elements are engaged with one another in such a manner as to couple the first member and the second member together so as not to be relatively rotatable, the hydraulic engagement device comprising:
   a sealing member provided on one of the cylinder and the piston; and
   a release groove provided on the other one,
   wherein, when a stroke of the piston exceeds a predetermined level due to a progression of wear of the friction engagement elements, the oil chamber releases oil pressure through the sealing member and the release groove.

2. The hydraulic engagement device according to claim 1, wherein an oil pressure sensor that detects the oil pressure of the oil chamber is provided.

3. A hydraulic engagement device comprising:
   a first member rotatable around a rotational axis;
   a second member rotatable around the rotational axis;
   a first friction engagement element connected to the first member to rotate around the rotational axis;
   a second friction engagement element connected to the second member to rotate around the rotational axis;
   a cylinder;
   a piston slidably provided in the cylinder;
   an oil chamber defined between the piston and the cylinder;
   hydraulic oil supplied to the oil chamber to move the piston to push the first friction engagement element or the second friction engagement element so that the first friction engagement element engages the second friction engagement element;
   a sealing member provided between the cylinder and the piston to seal the oil chamber; and
   a release groove provided on the cylinder or the piston, though which the hydraulic oil in the oil chamber is released when a stroke of the piston exceeds a predetermined level.

4. The hydraulic engagement device according to claim 3, further comprising an oil pressure sensor to detect oil pressure of the oil chamber.

5. The hydraulic engagement device according to claim 3, wherein
the stroke of the piston exceeds the predetermined level due to a progression of wear of the first friction engagement element and the second friction engagement element.

6. The hydraulic engagement device according to claim 3, wherein
the first friction engagement element engages the second friction engagement element to couple the first member and the second member together so as not to be relatively rotatable.

\* \* \* \* \*